June 26, 1951  D. G. GRISWOLD  2,558,295
HYDRAULIC DRILL PRESS AND CONTROL MEANS THEREFOR
Filed March 11, 1944  9 Sheets-Sheet 1
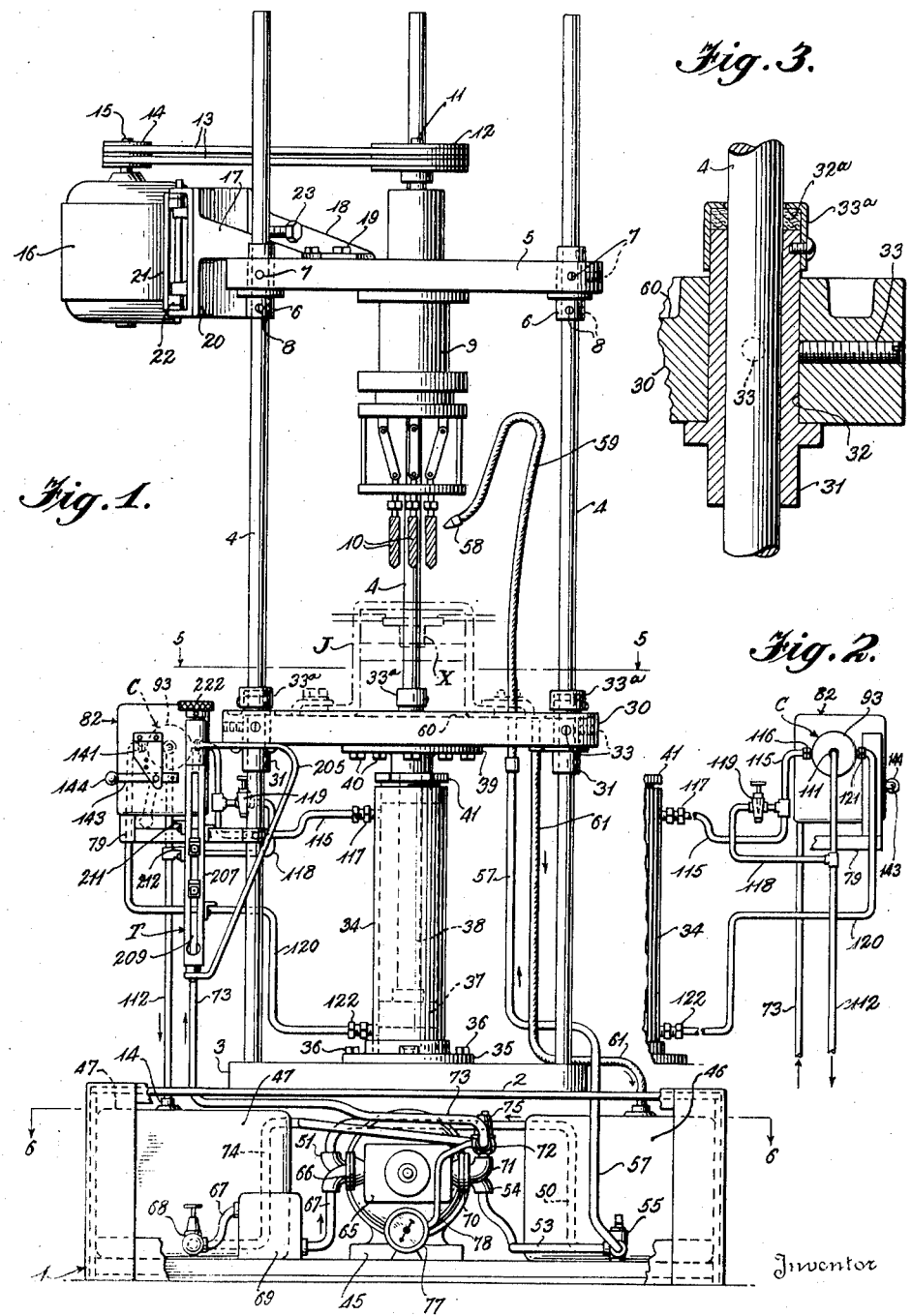
Inventor
Donald G. Griswold
By Bacon & Thomas
Attorneys June 26, 1951  D. G. GRISWOLD  2,558,295
HYDRAULIC DRILL PRESS AND CONTROL MEANS THEREFOR
Filed March 11, 1944  9 Sheets-Sheet 3
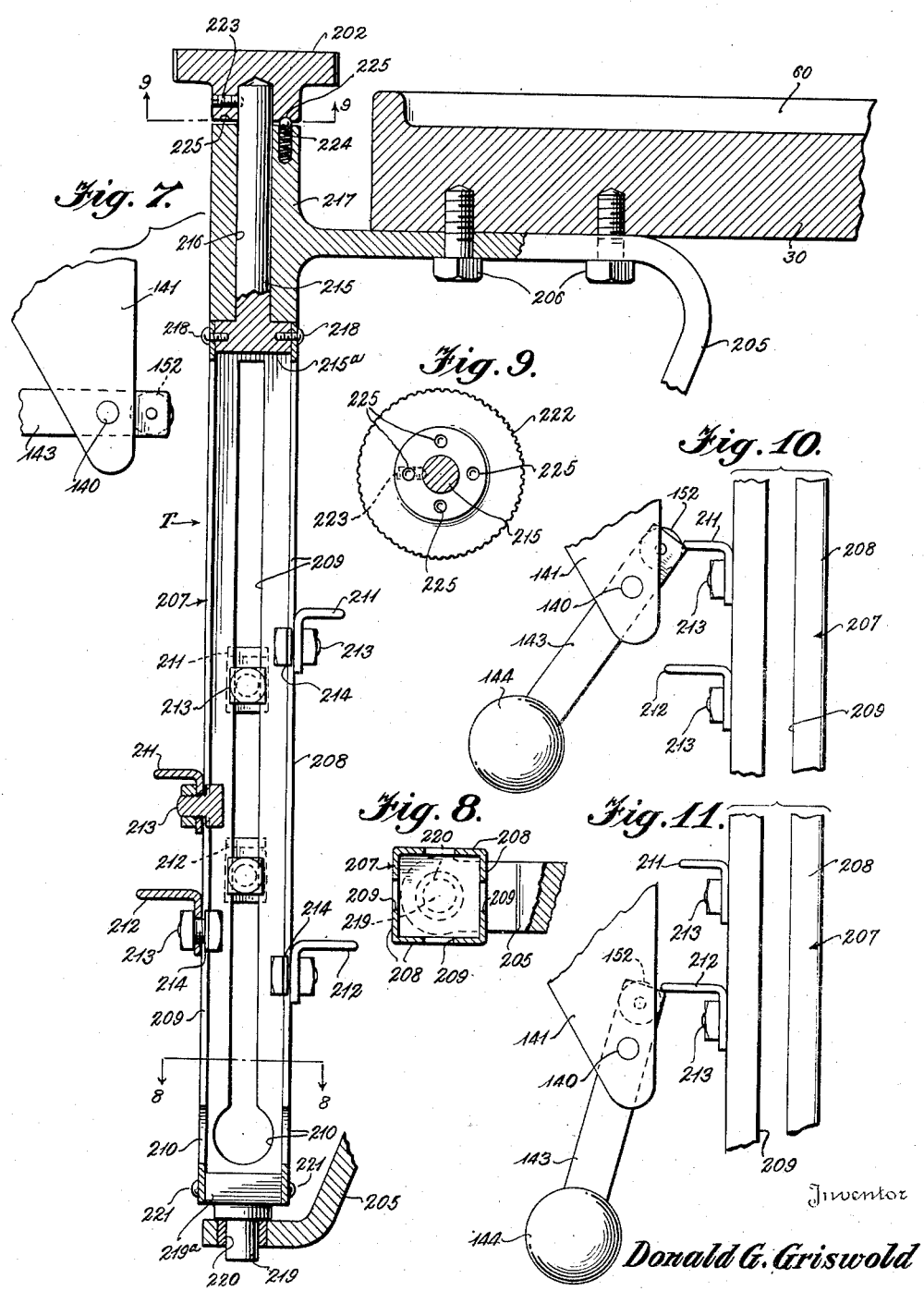
Inventor
Donald G. Griswold
By Bacon + Thomas
Attorneys

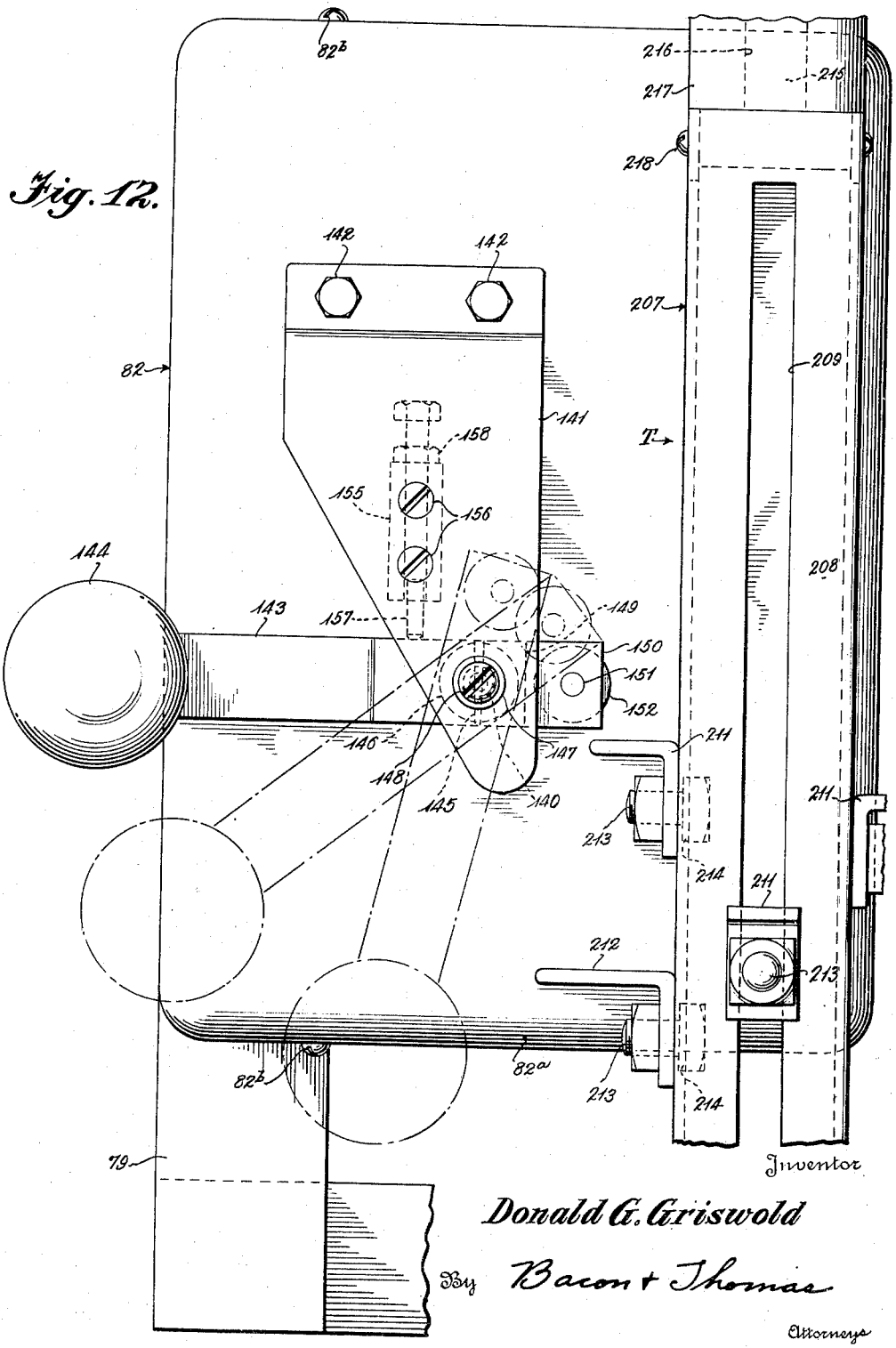

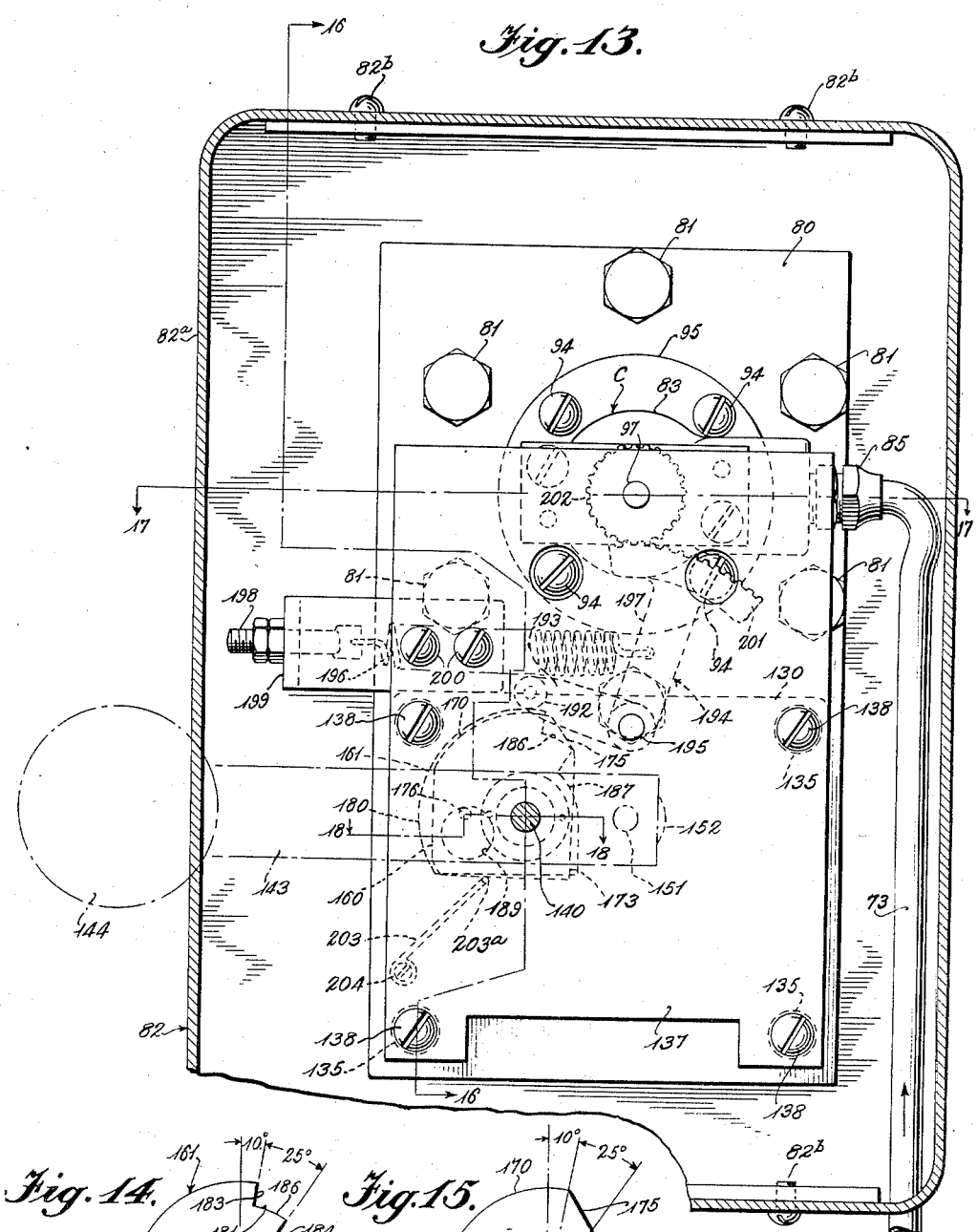

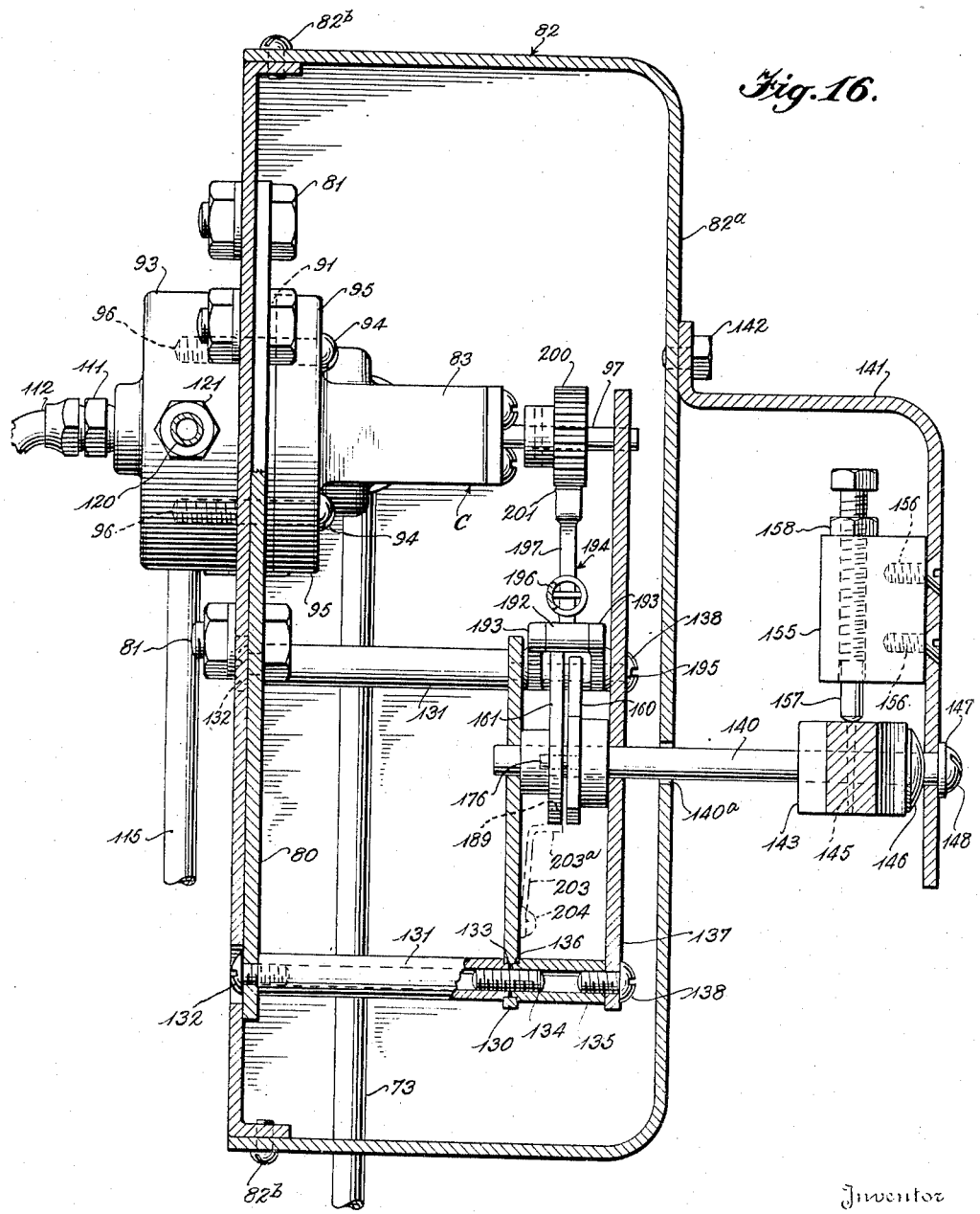

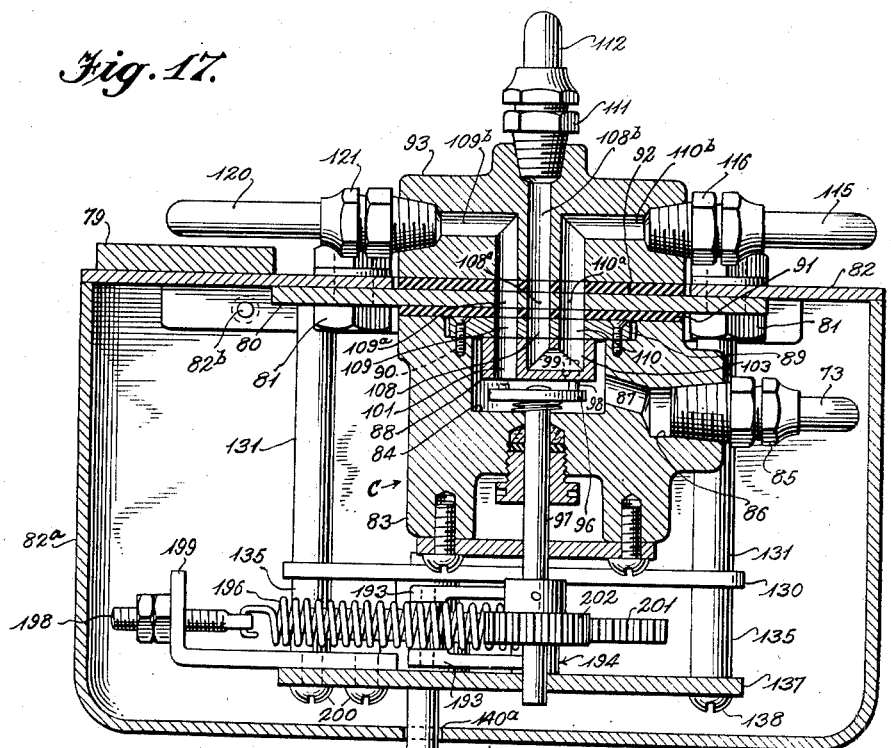

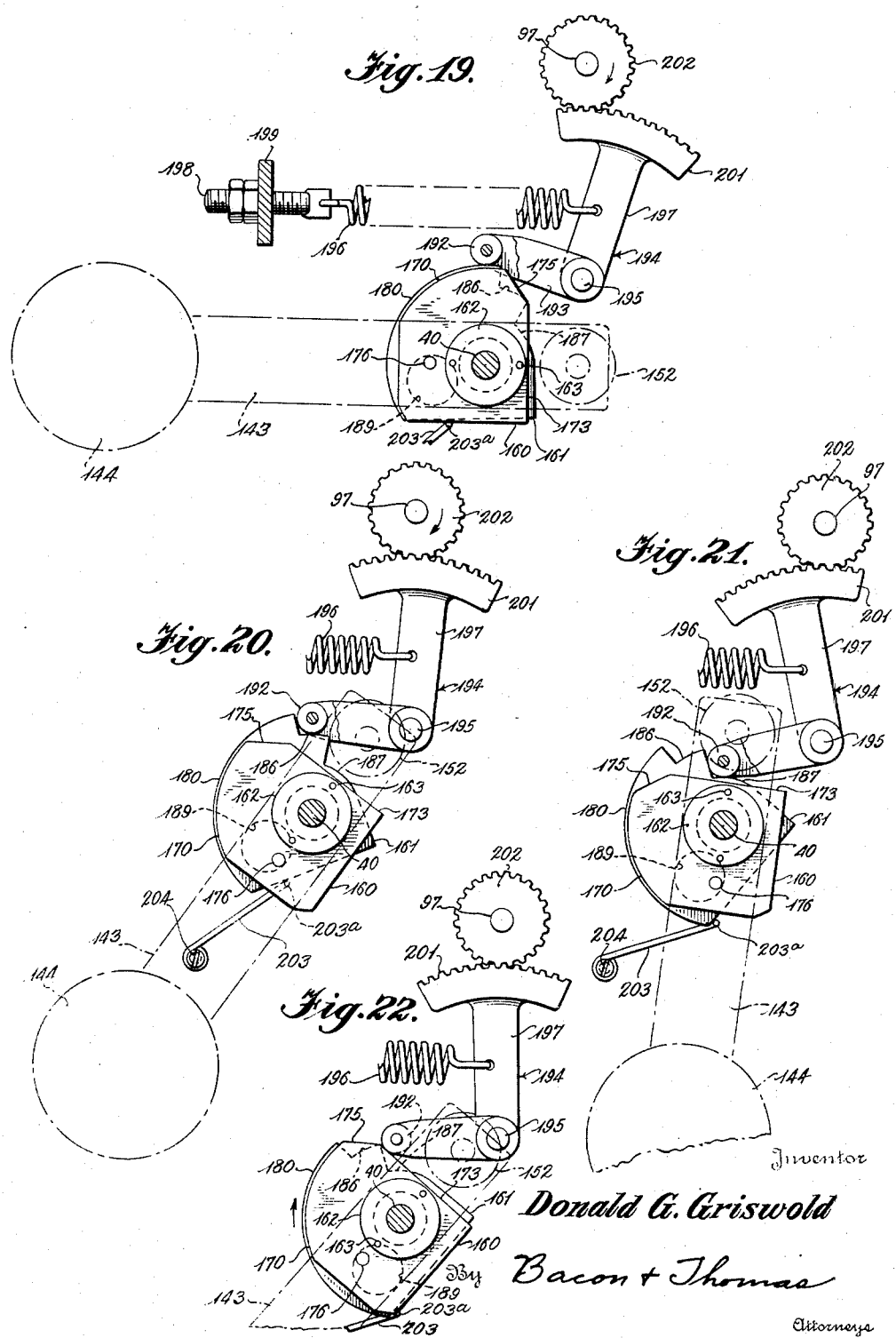

June 26, 1951     D. G. GRISWOLD     2,558,295
HYDRAULIC DRILL PRESS AND CONTROL MEANS THEREFOR
Filed March 11, 1944     9 Sheets-Sheet 9
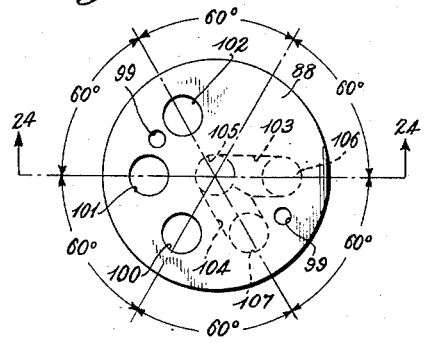
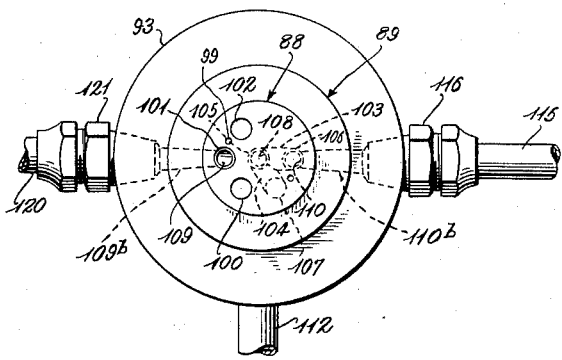
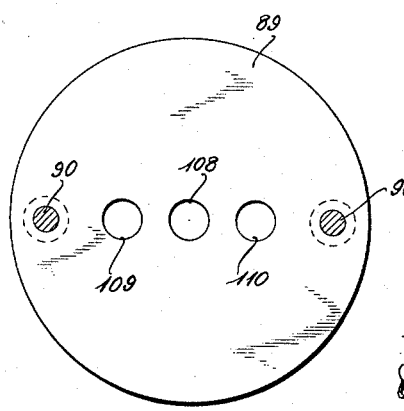
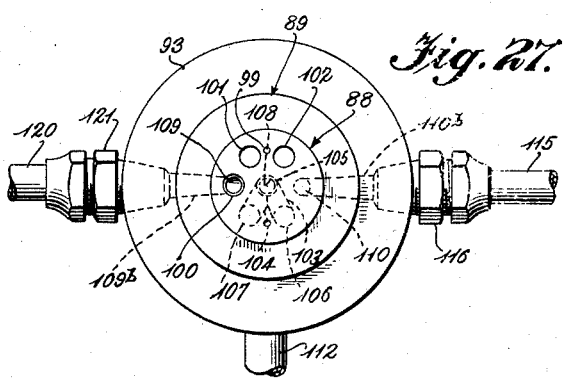
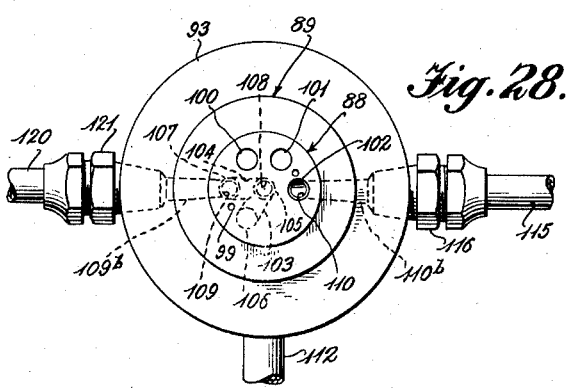
Inventor
Donald G. Griswold
By Bacon + Thomas
Attorneys Patented June 26, 1951

2,558,295

UNITED STATES PATENT OFFICE 2,558,295

HYDRAULIC DRILL PRESS AND CONTROL MEANS THEREFOR

Donald G. Griswold, Alhambra, Calif., assignor to Clayton Manufacturing Company, Los Angeles, Calif., a corporation of California Application March 11, 1944, Serial No. 526,100

11 Claims. (Cl. 77—33.6)

The present invention relates to hydraulically operated machine tools, and more particularly to a hydraulically operated, semi-automatic drill press and control means therefor.

The principal object of the invention is to provide hydraulically controlled means which will effect relative movement of a work-piece and tool toward each other at a suitable cutting speed or rate for the tool, and which will effect quick movement of said work-piece and tool relative to each other after the tool has performed its intended operation.

Another object of the invention is to provide hydraulically operated means for use in a machine tool for effecting movement of a work-piece toward a tool at a rapid rate until the work-piece and tool closely approach each other and to continue such relative movement at a much slower rate while the tool is performing its cutting operation, and to then effect a rapid retraction of said work-piece from said tool.

A more specific object of the invention is to provide a drill press in which the work is quickly raised to the dril level, is further raised at a relatively slow desired cutting feed rate during the drilling operation, and is then quickly lowered immediately after the completion of the drilling operation.

Another object of the invention is to provide a machine tool in which the rate of travel of the work relative to a tool or drill is preset and automatically controlled.

A further object of the invention is to provide control means for a drill press or other machine tool whereby the feed rate of the work toward the drill or tool can be infinitely varied to suit the hardness of the drill or tool and the hardness of the work-piece to thereby effect operation of the drill press or machine tool with a maximum of efficiency.

Another specific object of the invention is to provide control means for a drill press which is automatically actuated by the upward movement of the work-supporting table.

Another object of the invention is to provide a drill press that can be operated by unskilled labor.

A further object of the invention is to provide automatic control means for a drill press which affords a maximum of protection against drill burning and drill breakage.

A further object of the invention is to provide a hydraulic control system for a machine tool which will control the movement of the work relative to a tool, or vice versa, at desired predetermined rates.

A further object of the invention is to provide a novel control system including a valve and means for effecting "snap action" actuation of said valve to provide for accurate operation and close control of the mechanism whose operation is governed by said valve.

A still further object of the invention is to provide an adjustable control and trip mechanism for a machine tool which will selectively control said machine tool to make the same perform any one of a plurality of desired cycles of operation.

Other and further objects of the invention will be apparent from the following description taken in conjunction with the accompanying drawings in which:

Figure 1 is an elevational view of a drill press embodying the principles of the present invention, with portions of the sub-base broken away to facilitate illustration;

Figure 2 is a fragmentary rear view illustrating the conduit and by-pass connections between the control valve and the hydraulic cylinder which raises and lowers the work-supporting table;

Figure 3 is an enlarged detail view illustrating the means employed for lubricating the posts which guide the work-supporting table;

Figure 7 is an enlarged sectional view of the adjustable trip column which is mounted on the work-supporting table;

Figure 8 is a horizontal sectional view through the trip column taken on the line 8—8 of Figure 7;

Figure 9 is a sectional view taken on the line 9—9 of Figure 7 illustrating the sockets formed in the hub of the adjusting knob of the trip column which cooperate with a detent carried by the trip column supporting bracket;

Figure 10 is a fragmentary view illustrating the manner in which the upper trip lug carried by the trip column engages the control lever for automatically actuating the control valve to its intermediate position;

Figure 11 is a view similar to Figure 10 but showing the control lever in the extreme angular or near-vertical position to which it is actuated by the lower trip lug;

Figure 12 is a front elevational view of the casing which contains the control valve and the mechanism for intermittently "snap actuating" said control valve;

Figure 13 is a sectional view through the control casing showing the control valve and actuating mechanism therefor in elevation;

Figure 14 is a detail view of a driving cam which forms a part of the control valve actuating mechanism;

Figure 15 is a similar view of a driven cam;

Figure 16 is a vertical sectional view through the control casing taken on the line 16—16 of Figure 13;

Figure 17 is a horizontal sectional view through the control casing taken on the line 17—17 of Figure 13;

Figure 18 is a fragmentary sectional view through the control shaft and driving and driven cams taken on the line 18—18 of Figure 13;

Figure 19 diagrammatically illustrates the relation of the driving and driven cams necessary to position the ported element of the control valve in one operative position to effect a rapid upward movement of the work-supporting table;

Figure 20 is a view similar to Fig. 19 but showing the necessary relation of the driving and driven cams to position the ported element of the control valve in another operative position to effect slow upward feed movement of the work-supporting table;

Figure 21 is a view similar to Fig. 19 but illustrating the relation of the driving and driven cams for positioning the ported element of the control valve in still another operative position to effect a quick downward or return movement of the work-supporting table;

Figure 22 diagrammatically illustrates the manner in which the driving cam raises the cam roller clear of the stepped portions of the driven cam to permit the manual return of said driven cam to the position shown in Figure 19;

Figure 23 is an enlarged plan view of the rotatable ported element or valve disc of the control valve;

Figure 24 is a sectional view through the valve disc taken on the line 24—24 of Figure 23;

Figure 25 is an enlarged plan view of the seat for the ported disc shown in Figure 23;

Figure 26 diagrammatically illustrates the relative position of the ports in the disc and seat corresponding to the position of the cams shown in 19, whereby fast upward movement of the work-supporting table is effected;

Figure 27 is a diagrammatic view similar to Fig. 26 but illustrates the relative position of the ports in the disc and seat corresponding to the position of the cams shown in Fig. 20 to effect slow upward feed movement of the work-supporting table; and Figure 28 diagrammatically illustrates the relative position of the ports in the disc and seat corresponding to the position of the cams shown in Fig. 21 to effect rapid downward movement of the work-supporting table.

Figure 4:
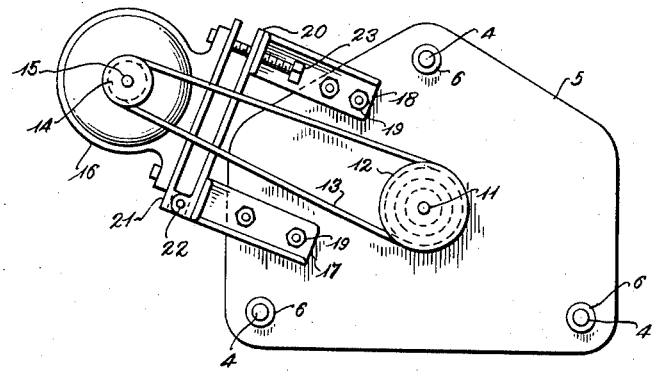
Figure 4 is a plan view of the drill press illustrating one arrangement of suitable drive means for the drill head.
Figure 5:
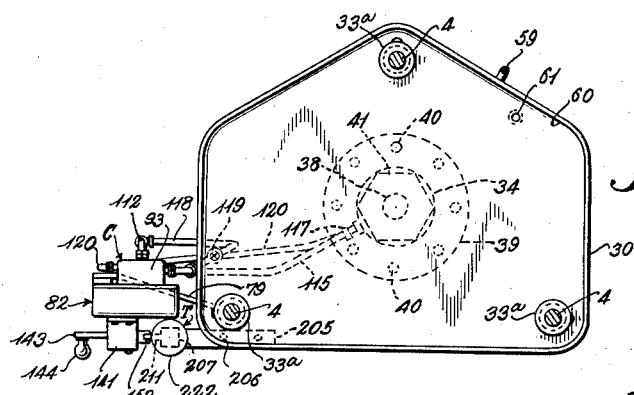
Figure 5 is a horizontal sectional view taken on the line 5—5 of Figure 1, just above the work-supporting table.
Figure 6:
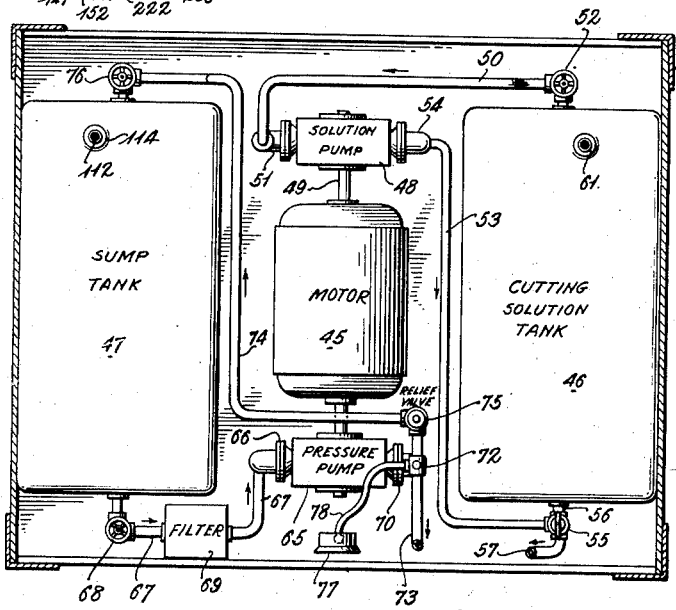
Figure 6 is a horizontal sectional view through the sub-base of the drill press taken on the line 6—6 of Figure 1.

Referring now to Figures 1 to 6 of the drawings, the numeral 1 generally indicates a sub-base which may be suitably built up from plates, angle irons or other structural shapes welded or otherwise secured together. The sub-base 1 includes a top plate 2 which serves as a support for a base plate 3. Three rigid vertical posts 4 have their lower ends fixedly mounted in the base plate 3. A head member 5 is supported by the posts 4 in spaced relation to the base plate 3 and is adapted to be adjusted to various heights along said posts, depending upon the character of the work to be drilled. A sleeve 6 surrounds each of the posts 4 and is secured to the head member 5 by set screws 7, and the sleeves 6 in turn are adjustably secured to the posts 4 by set screws 8.

The head member 5 carries a conventional drill head housing 9 containing suitable driving means (not shown) for driving one or more drills 10 from a driven shaft 11. The upper end of the shaft 11 carries a grooved pulley 12 which is operatively connected by a pair of V-belts 13 with a grooved drive pulley 14 secured to the shaft 15 of an electric motor 16. The motor 16 is adjustably mounted upon the head member 5 by brackets 17 and 18 secured to said head member by bolts 19. The brackets 17 and 18 are interconnected by a plate 20 and the motor 16 is mounted upon a plate 21 having a hinged connection at one end thereof with one end of the plate 20, as generally indicated at 22. The free end of the plate 21 is adjustable with respect to the adjacent end of the plate 20 by a bolt 23 arranged so that it can effect movement of the free end of the plate 21 relative to the adjacent end of the plate 20 to vary the tension in the V-belts 13. It will be understood that, when the motor 16 is driving the shaft 11, driving of the drills 10 will be effected through conventional mechanism contained in the drill head housing 9. While a plurality of drills 10 is illustrated in Figure 1, it will be apparent that in some instances only a single drill will be used and that any suitable chuck or spindle may be employed for the purpose.

A work-supporting table 30 is interposed between the base plate 3 and the head member 5. Three sleeves 31 are respectively fixed in openings 32 formed in the work-supporting table 30 by a plurality of set screws 33. The sleeves 31 are slidably arranged upon the vertical posts 4 so that the work-supporting table 30 can be raised or lowered with respect to the drill head. A lubricant retaining pad 32ª is received in an inverted cup 33ª mounted upon each of the sleeves 32 for lubricating the posts 4 as the table 30 is reciprocated relative to said posts.

In the preferred embodiment of the invention, the work-supporting table 30 is positively raised and lowered by a hydraulic cylinder 34, the lower end of which is provided with a flange 35, secured to the base plate 3 by bolts 36. A piston 37 is slidably mounted in the cylinder 34 and has one end of a connecting rod 38 secured thereto, the opposite end of said connecting rod having a flange 39 mounted thereon, which in turn is secured to the under side of the work-supporting table 30 by a plurality of bolts 40. The upper end of the hydraulic cylinder 34 is closed by a closure member 41 equipped with suitable packing (not shown) for sealing against the connecting rod 38. Means is provided for controlling the supply and exhaust of operating fluid to the hydraulic cylinder 34, as will be described in detail later.

Any suitable or conventional drilling jig J may be clamped upon the upper surface of the work-supporting table 30 for holding a work-piece X.

The sub-base 1 forms a convenient housing for suitable pumping mechanism, and tanks for a cutting solution and operating fluid, respectively, which make the present drill press self-contained. Thus, an electric motor 45 (Fig. 6) is suitably mounted in the sub-base 1 between a tank 46 adapted to contain a suitable cutting solution and a tank 47 which serves as a reservoir or sump for the operating fluid employed to actuate the piston 37 in the cylinder 34. A solution pump 48 is driven by a shaft 49 of the motor 45 and a conduit 50 connects the inlet side 51 of said pump with the cutting solution tank 46, a valve 52 being connected in said conduit for shutting off the supply of cutting solution to the tank in the event that it is unnecessary or undesirable to supply a cutting solution to the drill or drills 10. One end of a conduit 53 is connected with the outlet side 54 of the solution pump 48 and the opposite end of said conduit is connected with one opening of a conventional three-way cock 55. A pipe nipple 56 connects another opening of the three-way cock 55 with the solution tank 46, and a solution delivery conduit 57 is connected with the third opening of said cock and is adapted to deliver the cutting solution through a nozzle 58 to the drills 10. The conduit 57 preferably includes a flexible portion 59 capable of being adjusted to position the nozzle 58 in proper relation to the drills 10 when the head member 5 is either raised or lowered.

The upper surface of the work-supporting table 30 may be provided with a shallow recess 60 for collecting the discharged cutting solution, and a suitable flexible drain conduit 61 is arranged to return the solution from the recess 60 to the solution tank 46. Any suitable straining means (not shown) may be associated with the work-supporting table 30 to prevent drill cuttings from being returned to the solution tank 46 through the conduit 61. The three-way cock 55 is located at the front of the machine and may be adjusted to vary the volume of cutting solution which is discharged through the nozzle 58, the remaining solution supplied by the pump 48 being returned directly through said cock to the solution tank 46. When no cutting solution is necessary for a given drilling job, the three-way cock 55 may be adjusted so that all of the solution pumped may be returned to the solution tank 46, or as an alternative, the valve 52 may be closed so that no solution is supplied to the pump 48 and it runs idle.

The shaft 49 of the motor 45 also drives a pressure pump 65, the inlet side 66 of which is connected by a conduit 67 with the operating fluid reservoir 47. A shutoff valve 62 is connected in the conduit 67 and a filter unit 69, which filters the liquid withdrawn from the tank 47 before it can enter the pressure pump 65, is connected in the conduit 67 between the valve 68 and the pump inlet 66. The outlet side 70 of the pressure pump 65 has an elbow 71 (Fig. 1) mounted therein. A pipe-T 72 has its stem connected with the elbow 71 and one end of said pipe-T is connected with a conduit 73 which delivers operating fluid under pressure to a control valve C, the construction of which will be described in detail hereinafter. The other end of the pipe-T 72 is connected by a return conduit 74 with the operating fluid tank 47. A pressure-relief valve 75 is provided in the conduit 74 to relieve any excess pressure developed by the pump 65. If desired, a normally open shut-off valve 76 may be connected in the conduit 74 at a point between the tank 74 and the relief valve 75. A pressure gauge 77 may be connected with the pipe-T 72 by a conduit 78 tapped into one side of said pipe-T to indicate the pressure developed by the pump 65.

The control valve C, referred to hereinbefore, is mounted upon a plate 80 (Figs. 13, 16 and 17) which in turn is secured by bolts 81 to the rear wall of a control casing 82. The casing 82 is rigidly mounted upon the forward left post 4 by a bracket 79. The control valve C comprises a housing 83 containing a pressure chamber 84 for operating fluid under pressure. The housing 83 has a conventional fitting 85 mounted in the threaded portion of an opening 86 for connecting one end of the pressure fluid supply conduit 73 therewith. Communication is established between the opening 86 and the pressure chamber 84 by a passageway 87. A rotatable valve disc 88 is disposed in the pressure chamber 84 with one flat side thereof engaging a seat 89 which forms a closure for the pressure chamber 84. The seat 89 may be secured to the housing 83 by screws 90. A gasket 91 is disposed between the housing 83 and the mounting plate 80 and a second gasket 92 is disposed between the opposite side of said mounting plate and a fluid distribution base member 93. A plurality of bolts 94 extend through a flange 95 formed integral with the housing 83, through the gasket 90, plate 80 and gasket 91 and into threaded openings 96 in the base member 93. Thus, the bolts 94 not only hold the control valve parts together, but also serve to mount the control valve upon the plate 80.

The valve disc 88 is adapted to be driven by a drive washer 96 mounted upon one end of a shaft 97. A driving connection is established between the drive washer 96 and the disc 88 by a plurality of pins 98 which extend into openings 99 formed in the exposed side face of said disc.

The details of the porting of the disc 88 is best illustrated in Figures 23 and 24. It will be noted from Fig. 23 that the disc 88 is provided with three pressure ports 100, 101 and 102, respectively, which extend transversely through said disc and are arranged upon radii spaced 60° apart. The disc 88 is also provided with two generally U-shaped exhaust ports 103 and 104, respectively, the inner leg portion 105 of which is aligned with the axis of the disc 88 and the outer leg portions 106 and 107 of which are arranged the same distance from the axis of said disc as the pressure ports 100, 101 and 102. The exhaust ports 103 and 104 are also arranged upon radii 60° apart, with the radii of the pressure port 100 and the radii of the exhaust port 104 also spaced 60° apart.

The seat 89 for the disc 88 is best illustrated in Figure 25 and includes an axial drain port 108 and a first port 109 and a second port 110 diametrically arranged one upon each side of the drain port 108. The ports 109 and 110 are spaced the same distance from the axis of the seat 89 as the ports 101, 102 and 103 and the exhaust port leg portions 106 and 107 of the disc 88 are spaced from the axis of said disc, so that, as the disc 88 is rotated relative to the seat 89, the pressure ports 100, 101 and 102 can register with one or the other of the first and second ports 109 and 110, respectively, of the seat 89 and the outer leg portions 106 and 107 of the exhaust ports 103 and 104 can register with one or the other of said first and second ports.

The gasket 91 (Fig. 17), the mounting plate 80 and the gasket 92 are provided with aligned passageways generally identified by the numerals 108a, 109a, and 110a which respectively register with the drain port 108, the first port 109 and the second port 110 of the valve seat 89. The base member 93 has a drain passage 108$^b$ which communicates with the passageway 108$^a$, and also has a first passage 109$^b$ and a second passage 110$^b$ which communicate with the passageways 109$^a$ and 110$^a$, respectively. A conventional fitting 111 is mounted in a threaded portion of the passage 108$^b$ and connects one end of a drain or return conduit 112 to the base member 93, and the opposite end of said drain conduit is connected by a conventional fitting 114 (Fig. 1) with the sump tank or reservoir 47. A conduit 115 has one end thereof connected by a conventional fitting 116 with a threaded portion of the second passage 110$^b$ in the base member 93 and its opposite end is connected by a conventional fitting 117 with the upper end of the hydraulic cylinder 34. A by-pass conduit 118 has one end thereof connected with the conduit 115 at a point between the base member 93 and the cylinder 34 and its opposite end is connected with the return conduit 112 at a point between said base member and the tank 47. An adjustable feed or flow-restricting needle valve 119 is connected in the by-pass conduit 118 and is arranged to control the rate at which operating fluid can exhaust from the upper end of the cylinder 34 through said by-pass conduit and thus govern the rate at which the work-supporting table 30 moves relative to the drills 10 during the drilling operation. It will be understood that the adjustment of the feed valve 119 may be varied in accordance with the hardness of the material being drilled and/or the hardness of the drill itself so that the drill press will operate at a maximum of efficiency. A conduit 120 has one end thereof connected by a conventional fitting 121 with a threaded portion of the first passage 109$^b$ in the base member 93 and the opposite end of said conduit is connected by a conventional fitting 122 with the lower end of the hydraulic cylinder 34.

As has been previously indicated, the rapid upward movement of the work-supporting table 30 to present the work to the drills 10, the continued upward movement of the table at a relatively slow rate corresponding to the proper cutting feed for the drills, and the rapid lowering of the work-supporting table 30 after the drilling operation has been completed, are all controlled by the control valve C. The valve disc 88 is adapted to be manually actuated clockwise and mechanically actuated counter-clockwise by a cam and gear control mechanism operatively connected with the shaft 97 and which mechanism in turn is automatically actuated by a trip column mounted upon the work-supporting table 30, all as will appear more fully hereinafter.

The control casing 82, in addition to forming a partial enclosure for the control valve C, contains the novel cam and gear mechanism for effecting intermittent rotation of the shaft 97 which drives the valve disc 88. Such mechanism is also preferably mounted upon the plate 89 and includes an auxiliary plate 130 (Fig. 16) arranged parallel to the plate 89 but maintained in spaced relation thereto by four spacer members 131. One end of each of the spacers 131 is secured to the plate 89 by a screw 132 and the opposite end thereof is shouldered as indicated at 133 to provide a support for the auxiliary plate 130. Studs 134 are threaded into the shouldered end of the spacers 131 and a second spacer 135 provided with a complemental shoulder 136 is threaded onto the studs 134. Thus, the two shouldered spacers 131 and 135 are arranged to tightly clamp the plate 130 between the shoulders thereof. A third plate 137 is secured against the outer end faces of the spacers 135 by screws 138. Incidentally, the plate 137 provides a support for the outer end of the shaft 97.

The spaced plates 130 and 137 provide a support for a control shaft 140 one end of which projects through an opening 140$^a$ in a cover 82$^a$ detachably secured to the control casing 82 by screws 82$^b$. The projecting end of the control shaft 140 is rotatably supported in a bracket 141 mounted upon the outer face of the cover 82$^a$ by bolts 142. A hand-operated control lever 143 (Fig. 17) carries a knob 144 at one end thereof, and an intermediate portion of said lever is fixed to the control shaft 140 by a pin 145. A dished friction element 146 is mounted upon the control shaft 140 between the inner face of the bracket 141 and the adjacent surface of the control lever 143. A washer 147 and a screw 148 are mounted upon the outer extremity the control shaft 140 and apply sufficient stress to the dished element 146 to frictionally maintain the control lever 143 in any desired position of adjustment with respect to the bracket 141. The free end of the control lever 143 is slotted as indicated at 149 to provide a pair of arms 150 which support a pin 151 upon which a roller 152 is freely rotatable.

The control lever 143 is adapted to be automatically rotated in a counter-clockwise direction from the full line to the dotted line position shown in Figure 1 by a tripping device generally indicated by the letter T and mounted for movement with the work-supporting table 30, all as will be explained later. A block 155 (Fig. 16) is secured to the inner face of the bracket 141 by counter-sunk screws 156, and a threaded adjustable stop 157 is carried by said block. A jamb nut 158 locks the stop 157 in any desired position of adjustment. The block 155 and the stop 157 are offset to the left of a vertical plane passing through the axis of the control shaft 140, as best illustrated in Figure 12. The lower end of the stop 157 is adapted to be engaged by the upper surface of the control lever 143 to thus positively limit the manual clockwise movement that may be imparted to said control lever.

The control shaft 140 (Fig. 18) carries a driving cam 160 and a driven cam 161, said cams being disposed between the plates 130 and 137. The driving cam 160 is secured to the hub portion 162 thereof by pins 163, and the hub 162 in turn is fixed to the control shaft 140 by a pin 164. On the other hand, the hub 165 of the driven cam 161 is free to rotate upon the control shaft 140.

The shape of the driving cam 160 is best illustrated in Figure 15 and includes two arcuate portions 170 and 171 concentric with the center of the cam and a flat chordal portion 172 interconnecting said arcuate portions. The driving cam 160 also includes a flat portion 173 substantially parallel with the chordal portion 172 and a third flat portion 174 arranged perpendicular to the portion 173 and connecting one end of said portion with one end of the arcuate portion 171. The opposite end of the flat portion 173 and the adjacent end of the arcuate portion 170 are connected by a flat portion 175 having a length defined by an angle of 25°. It will also be noted that the arcuate portion 170 extends to the right of a vertical line passing through the axis of the cam 160 a distance corresponding to an angle of 10°. A pin 176 is mounted on the cam 160 at a predetermined distance from the axis of the cam and on a radial line at right angles to the flat portions 172 and 173.

The contour of the driven cam 161 is best illustrated in Fig. 14 and has a concentric arcuate portion 180 formed on a radius slightly greater than that defining the arcuate portion 170 of the driving cam 160. The arcuate portion 180 extends beyond a vertical line drawn through the axis of the cam 160 for a distance corresponding to an angle of 10°. The driven cam 161 is further provided with concentric arcuate portions 181 and 182, the portion 181 having a length corresponding to an angle of 25° and being connected at one end by a radial portion 183 with one end of the arcuate portion 180. The arcuate portions 181 and 182 are connected by a radial portion 184. The arcuate portion 182 merges into a vertical portion 185, as shown. The radial portion 183 and the arcuate portion 181 thus cooperate to form a step 186 and the radial portion 184 and the arcuate portion 182 cooperate to form a second step 187. The vertical portion 185 and the arcuate portion 180 are interconnected by a horizontal flat portion 188. The cam 161 is further provided with a circular opening 189 which is considerably larger in diameter than the pin 176. The opening 189 has its center arranged on a radial line 15° below a horizontal plane passing through the axis of said cam and on a radius equal to that upon which the hole for the pin 176 is drilled. The cams 160 and 161 are arranged in confronting relation on the control shaft 140, as best shown in Fig. 16, and the pin 176 carried by the cam 160 projects into the opening 189 in the cam 161 to provide a lost-motion driving connection between the two cams.

The driven cam 161 cooperates with a roller 192 (Figs. 13 and 19) rotatably mounted between the ends of spaced arms 193 forming a part of a bell crank lever 194. The bell crank lever 194 is pivotally mounted upon a shaft 195 carried by the plates 136 and 137. The roller 192 is continuously urged into engagement with either the driving cam 160 or the driven cam 161 by a tension spring 196 one end of which is connected to an arm 197 of the bell crank lever 194 and the opposite end of which is connected to a bolt 198 adjustably mounted in a bracket 199 secured to the plate 137 by bolts 200. The outer extremity of the arm 197 carries a gear segment 201 that meshes with a pinion 202 fixed to the valve disc drive shaft 97. The roller 192 is shown in engagement with the arcuate surface 180 of the driven cam (Figure 13) and is urged into contact with said surface by the pull exerted by the spring 196. However, as the driven cam 161 is turned counter-clockwise, as will be explained later, the roller 192 successively drops from the surface 180 onto the step 186 and then onto the step 187. Such movement of the roller 192 necessarily allows the spring 196 to effect rotation of the bell crank lever 194 about its pivot 195 with the result that the gear segment 201 imparts clockwise rotation to the pinion 200 and to the shaft 97 driven thereby to effect clockwise rotation of the valve disc 88. The driving cam 160 is adapted to hold the roller 192 clear of the steps 186 and 187 during the return movement of the driven cam 161, as has been pointed out before.

While the driven cam 161 is free on the control shaft 140, its rotation is yieldably restricted by a torsion spring 203 one end of which is fixed to the plate 136 by a screw 204 and the free end 203ª of which is bent transversely for engagement with the flat surface 188 of the driven cam 161, as is best illustrated in Figures 13 and 16.

The tripping mechanism T for automatically tripping the control lever 143 to successively position the disc 88 of the control valve to effect the desired movements of the work-supporting table 30 is illustrated in detail in Figures 7 to 11, inclusive. The device T includes a mounting bracket 205 which is secured to the underside of the work-supporting table 30 by bolts 206. The bracket 205 serves as a support for a rotatable trip post generally identified by the numeral 207. The trip post 207 is hollow and square in cross-section, as shown in Figure 8, but may assume any suitable cross-sectional shape. Each of the four sides 208 of the post 207 is provided with an elongated slot 209 having an enlarged portion 210 at its lower end. Each of the sides 208 carries a set of vertically spaced elements or trip lugs 211 and 212. Each of the lugs 211 and 212 is secured to the trip post 207 by bolts 213 which have a portion of the underside of the head thereof cut away as indicated at 214 so that a portion of said head can be received in the slot 209 and be restrained from rotation by the side walls of said slot. The opening 210, of course, is large enough to permit insertion of the head of the bolt 213 through the side wall 208.

The trip lugs 211 and 212 on the trip post 207 are vertically spaced a predetermined distance apart, depending upon the desired depth of the drilling operation. When the control lever 143 is manually moved to the horizontal position shown in full lines in Figure 1, the valve disc 88 is properly positioned to admit operating fluid to the lower end of the cylinder 34 and to exhaust spent operating fluid from the upper end of said cylinder to effect raising of the table 30, as will be set forth in more detail later. As the table 30 rises, the trip lug 211 engages the roller 152 and trips the control lever 143 by moving the same counter-clockwise to the intermediate position shown in full lines in Figure 10 and in dot and dash lines in Figure 12, wherein the pilot disc 88 is so positioned that a continued rising of the table 30 is permitted, but at a much slower rate suitable for the optimum cutting speed of the drills 10. The friction element 146 holds the control lever 143 in the position to which it has been moved by the lug 211. As the table 30 continues to rise, the second trip lug 212 will engage the roller 152 and control lever 143 will again be tripped causing the same to move in a counter-clockwise direction to the lower extreme position shown in full lines in Figure 11 and in dot and dash lines in Figure 12. Such movement of the control lever 143 positions the valve disc 88 to effect a rapid downward movement of the table 30. Here again, the friction element 146 holds the control lever 143 in the position to which it has been moved by the lug 212. The vertical distance between the roller 152 (when the control lever 143 is in its horizontal position) and the trip lug 211 determines the distance that the work-supporting table 30 will rise rapidly to present the work to the drills 10; whereas, the vertical spacing of the trip lugs 211 and 212 determines the further movement of the table at a slow rate to accomplish the desired depth of drilling.

In order to adapt the trip post 207 to vary the movement of the work-supporting table 30 for different drilling jobs that require different heights of rapid rising movement of the table to present the work to the drills and which may also require different depths of drilling, said post is mounted for rotation in the bracket 205 so that the differently adjusted sets of trip lugs associated with the other side walls 208 of said post may be presented for coaction with the roller 152 of the control lever 143. Thus, an extension 215 is provided at the upper end of the trip post 207 and is received in a circular opening 216 in a boss portion 217 which may, if desired, be formed either integral with or welded to the bracket 205. The extension 215 includes a squared portion 215ª received in the upper end of the post 207 and which is secured to said post by screws 218. Similarly, an extension 219 is provided for the lower end of the post 207 and includes a squared portion 219ª which extends into the post 207 and is secured to said post by screws 221.

Rotation of the trip post 207 may be manually effected by a knurled knob 222 fastened to the upper end of the extension 215 by a set screw 223. The post 217 is maintained in any one of four desired positions of adjustment by a spring-pressed ball detent 224 mounted in the boss 217 and arranged to cooperate with any one of four semi-spherical sockets 225 formed in the lower face of the hub portion of the knob 222, said sockets being spaced 90° apart, as is best shown in Figure 9.

In order to operate the drill press described hereinabove, the motor 16 for driving the drills 10 and the motor 45 for driving the solution pump 48 and pressure pump 65 are started and then the operator places a work-piece X in the jig J. The drill press is in its idle position with the work-supporting table 30 lowered when the control lever 143 is in the dotted line position, slightly inclined to the vertical, shown in Figure 1. The corresponding position of the cams 160 and 161 is illustrated in Figure 21, and the corresponding position of the valve disc 88 relative to its seat is diagrammatically shown in Figure 28. In order to effect elevation of the work-supporting table 30, the operator must rotate the control lever 143 clockwise from the near-vertical dotted line position to the horizontal full line position shown in Figure 1. As the control lever 143 is turned clockwise the control shaft 40 is also rotated clockwise carrying the driving cam 160 along with it. In view of the lost-motion driving connection between the driving cam 160 and the driven cam 161 (provided by the pin 176 and the opening 189) the driven cam 161 is not immediately rotated but is momentarily restrained from rotation by the engagement of the radial portion 184 of the driven cam 161 with the roller 192 (see Fig. 21). By the time that the pin 176 has traversed the opening 189 and engaged the opposing wall thereof the driving cam 160 will have assumed the position relative to the driven cam illustrated in Figure 22, so that the portion 173 of the driving cam 160 will have raised the roller 192 out of engagement with the step 187 of the driven cam 161. It will be apparent from Figure 22 that as the driving cam 160 is further rotated clockwise the portion 175 of said cam will engage the roller 192 and hold it clear of the next step 186 of the driven cam 161 so that eventually the roller 192 rides off the surface 175 of the driving cam 160 and onto the arcuate surface 180 of the driven cam, as illustrated in Figure 19; the control lever 143 assuming a horizontal position as indicated by the dot and dash lines in Figure 19.

The manual rotation of the cams 160 and 161 by actuation of the control lever 143 necessarily results in a certain amount of angular movement of the bell crank lever 194 about its pivot 195. Specifically, the bell crank 194 is moved from the position shown in Figure 21 to that shown in Figure 19, so that the gear segment 201 carried by said bell crank effects rotation of the valve disc drive shaft 97 and the pinion 202 carried thereby through an angle of about 120°. The rotation of the pinion 202 produces an equivalent angular rotation and repositioning of the valve disc 88 relative to its seat 89. In other words, the disc 88 is shifted with respect to its seat 89 from the position shown in Figure 28 to that illustrated in Figure 26. In Figure 26, as well as in Figures 27 and 28, the ports in the seat 89 and the passages in the base member 93 have purposely been drawn out of scale in order to facilitate illustration of the overlapping or registering relation of the ports for the three operative positions of the disc 88. It will be noted that when the disc 88 is in its operative position shown in Figure 26, the pressure port 101 of said disc registers with the first port 109 in the seat 89 so that operating fluid under pressure can flow from the pressure chamber 84 (Fig. 17) of the housing 83 through said ports into passageway 109ª, passage 109ᵇ, and conduit 120 to the lower end of the hydraulic cylinder 34. Simultaneously, the exhaust port 103 of the disc 88 interconnects the drain port 108 and the second port 110 in the seat 89 so that spent operating fluid can be drained from the upper end of the hydraulic cylinder 34 through the conduit 115, passage 110ᵇ in the base member 93, passageway 110ª, port 110 in the seat 89, exhaust port 103 in the disc 88, port 108 in the seat 89, passageway 108ª, passage 108ᵇ in the base member 93, and into conduit 112 for return to the sump tank 47 (Fig. 1). Thus, operating fluid under pressure supplied by the pump 65 and conducted to the control valve C through the conduit 73 is rapidly admitted into the lower end of the hydraulic cylinder 34 to effect a quick raising of the work-supporting table 30, while spent operating fluid is simultaneously drained from the upper end of said cylinder and returned to the sump tank 47 for reuse.

The upward movement of the table 30 carries the tripping mechanism T along with it and as said table rises to a position where the work-piece X is about to be engaged with the drills 10, the trip lug 211 engages the roller 152 to cause the control lever 143 to move counter-clockwise through a predetermined angle to trip said control lever so that it comes to rest in the intermediate position shown in Figure 10. Such tripping or rotation of the control lever 143 necessarily produces a corresponding rotation of the control shaft 40 and the cams 160 and 161 associated with said shaft. The timing or adjustment of the trip lug 211 on the trip post 207 is such that the pin 176 through its lost motion connection with the driven cam 161 will only effect rotation of said driven cam through an angle sufficient to permit the roller 192 to drop from the arcuate surface 180 of said driven cam onto the step 186. In view of the fact that the step 186 is steep and in view of the further fact that the spring 196 is constantly exerting a counter-clockwise pull on the bell crank lever 194, the movement of the roller 192 from the surface 180 to the step 186 is quite sudden. The difference in radius between the arcuate portion 180 and the arcuate portion 181 defining the step 186 is such that the bell crank lever 194 is rotated by the action of the spring 196 to effect a clockwise rotation of the valve disc 88 through an angle of about 60°. The coaction of the roller 192 with the driven cam 161 under the influence of the spring 196 is such as to provide a "snap action" which quickly shifts the disc 88 from one operative position to another. Meanwhile, the end 203ª of the torsion spring 203 restrains the cam 161 from undue rotation and avoids any possibility of the roller 192 effecting such rotation of said cam as would cause the roller to prematurely ride off the step 186 and onto the step 187. However, once the roller 192 has engaged with the shoulder 186, the pressure applied through the spring 196 will hold the bell crank 194, and hence the valve disc 88, against inadvertent movement out of the position into which it has been moved by the snap-action mechanism.

When the roller 192 is engaged with the step 186, the disc 88 assumes the position relative to its seat 89 diagrammatically illustrated in Figure 27. Such change in position of the disc 88 has the effect of causing all further upward movement of the work-supporting table 30 to occur at a much slower predetermined rate corresponding to the optimum cutting speed of the drills 10 for the particular metal being drilled, so that burning or breaking of said drills is wholly avoided and a maximum of production capacity is maintained. It will be noted from Figure 27 that the pressure port 100 of the disc 88 now registers with the first port 109 of the seat 89 so that operating fluid under pressure can continue to flow to the lower end of the cylinder 34 through the various passageways and the conduit 120 as previously described. It will be further noted that none of the ports of the disc 88 now registers with the second port 110 in the seat 89 so that said port is blocked and spent operating fluid from the upper end of the cylinder 34 can no longer be returned to the sump tank 47 by passage through the control valve C, as occurred during the rapid upward movement of the work-supporting table 30. Hence, such spent operating fluid must now return to the tank 47 through the by-pass conduit 118, which has the adjustable flow-restricting feed control valve 119 connected therein. The return of operating fluid to the tank 47 now must take place through a portion of the conduit 115 (Fig. 2), the by-pass conduit 118 and a portion of the return conduit 112, the control valve C being completely by-passed. The feed control valve 119 is adjusted so that it permits spent operating fluid to exhaust from the upper end of the cylinder 34 at such rate as will provide the desired feeding of the work to the drills 10 during the drilling operation. It will be apparent that the upward movement of the piston 37 in the cylinder 34 occurs against the predetermined resistance offered to the discharge of fluid from the upper end of the cylinder by the feed valve 119. The feed valve 119 is adjustable to provide any desired feed rate and, hence, constitutes means by which the feed rate may be infinitely varied within the capacity of the control system. A cutting solution is normally supplied to the drills 10 from the nozzle 58, as will be readily understood.

The work-supporting table 30 continues to rise at the predetermined feed rate until said table has risen to such height as to effect the engagement of the trip lug 212 with the roller 152 of the control lever 143. Continued upward movement of the table 30 causes the trip lug 212 to trip the control lever 143 to move it counter-clockwise through a further predetermined angle. Such further actuation of the control lever 143 produces a corresponding rotation of the driving and driven cams 160 and 161, respectively. However, at this stage there is no lost motion between the pin 176 and the wall of the opening 189, and the driven cam 161 is caused to rotate through the same angle as the driving cam 160 with the result that the cam 161 is moved through an angle of at least 25° to enable the roller 192 to drop off the step 186 and onto the step 187. Here again, the tension spring 196 effects a "snap action" and the torsion spring 203 prevents any undesirable rotation of the driven cam 161 as might otherwise occur as a result of the action of the roller 192 against the cam. The height of the radial portion 184 is such that the bell crank lever 194 is moved counter-clockwise by the spring 196 to again effect clockwise rotation of the valve disc shaft 88 through another angle of 60°. The valve disc 88 then assumes the position relative to its seat 89 diagrammatically illustrated in Figure 28. The disc 88 is now positioned so that it can effect a rapid down movement of the table 30 to retract the work from the drills 10. The pressure port 102 of the disc 88 is shown in registration with the second port 110 of the seat 89 so that operating fluid under pressure is admitted to the upper end of the cylinder 34 through the conduit 115 and, simultaneously, the exhaust port 104 of the disc 88 establishes communication between the first port 109 and the drain port 108 of the seat 89 so that spent operating fluid can be readily forced out of the lower end of the cylinder 34 through the conduit 120, passed through the control valve C and then returned through the conduit 112 to the tank 47. Some operating fluid under pressure will be by-passed to the tank 47 through the conduit 118 at this time, but the resistance to flow offered by the feed valve 119 is usually such that only a small quantity of fluid is returned through the by-pass and the major portion passes through the conduit 115 into the upper end of the cylinder 34 to effect the rapid down movement of the work-supporting table 30.

When the table 30 arrives at its lowermost position, the control system and drill press idle. All excess operating fluid pumped by the pump 65 at such time is by-passed to the tank 47 by flow through the relief valve 75 and return conduit 74. The drill press operator then removes the drilled work-piece X, inserts another work-piece X in the jig J and then rotates the control lever 143 to a horizontal position to repeat the cycle aforedescribed.

It will be apparent that the drill press operator can manually move the control lever 143 to the position shown in Fig. 10 or Fig. 11 to obtain a slow feed, or a quick return of the table 30, respectively, at any time, regardless of the position of the trip column 207.

It will be understood that if a given drill press is to be used only for drilling operations which do not require a cutting solution, the solution pump 48 and the cutting solution tank 46, together with the conduits 50 and 53 interconnecting the same, may be omitted. It will be further understood that a drill press equipped with the cutting solution tank 46 and pump 48 can be operated without application of said cutting solution to the drills, if such solution is unnecessary, simply by adjusting the three way cock 55 to divert all of the solution pumped by the pump 48 back to the solution tank 46.

A maximum of production can be obtained by having the operator run two or more machines, the loading of one machine being accomplished while another is performing a drilling operation.

While the control valve C and the feed valve 119 have been associated with a system for controlling the operation and feed of a work-supporting table for a drill press, it will be apparent that such control means is adaptable to other types of machine tools in which a relatively slow feed of the work with respect to a cutting tool is desired during a cutting operation, and quick retraction of the work is desired after the tool has completed its stroke or intended cutting operation.

It will be clear from the foregoing description that machine tools, and drill presses in particular, constructed in accordance with the principles of the present invention can be operated by unskilled labor without danger of burning or breaking the drills. It will also be apparent that drill presses constructed in accordance with the principles of the present invention provide means whereby a maximum of production may be obtained with a minimum of labor.

It will be understood that various changes may be made in the details of construction of the drill press and in the details of the control system, control valve, and the tripping mechanism for the control valve, without departing from the spirit of the invention or the scope of the annexed claims.

I claim:

1. A drill press comprising: a base; a plurality of posts mounted upon said base; a drill head carried by said posts in spaced relation to said base; a work-supporting table slidably mounted upon said posts between said base and drill head; a vertical hydraulic cylinder for effecting movement of said work-supporting table relative to said drill head; a piston in said hydraulic cylinders; a piston rod connecting said piston with said work-supporting table; a control valve for controlling the supply and exhaust of operating fluid to said hydraulic cylinder, said control valve including a pressure chamber, a rotatable disc in said pressure chamber, a seat cooperable with said disc, and a base member adjacent said seat, said seat having an axial drain port and a first port and second port radially spaced from said axial drain port, said base member having a drain passage and first and second passages communicating with said drain port and first and second ports, respectively, of said seat, said rotatable disc having three pressure ports, and two elongated exhaust ports, said exhaust ports each having an end which at all times registers with the axial drain port in said seat; a first conduit connected with said control valve for supplying operating fluid under pressure to said pressure chamber of said control valve; a second conduit having one end thereof communicating with the drain passage of said base member for draining spent operating fluid from said control valve; a third conduit establishing communication between said first passage of said base member and the lower end of said hydraulic cylinder; a fourth conduit establishing communication between said second passage of said base member and the upper end of said hydraulic cylinder; a by-pass conduit having one end thereof connected with said fourth conduit arranged to by-pass fluid from the upper end of said hydraulic cylinder; an adjustable flow-restricting valve connected in said by-pass conduit for controlling the rate at which spent operating fluid can be exhausted from the upper end of said hydraulic cylinder through said by-pass conduit; and means for effecting rotation of said rotatable disc, said rotatable disc having three operative positions: a first operative position in which one of said pressure ports registers with said first port of said seat to permit operating fluid under pressure to flow from said pressure chamber through said third conduit to the lower end of said hydraulic cylinder and in which one of said exhaust ports interconnects said second port and said axial drain port of said valve seat to establish communication between said fourth and second conduits to allow spent operating fluid under pressure to exhaust from the upper end of said hydraulic cylinder, whereby said work-supporting table is rapidly moved toward said drill head; a second operative position in which another of said pressure ports registers with said first port of said seat so that operating fluid under pressure can continue to flow through said third conduit to the lower end of said hydraulic cylinder and in which said second port in said seat is blocked by said rotatable disc so that exhaust fluid from the upper end of said cylinder must flow through said by-pass conduit at the restricted rate determined by the adjustment of said flow-restricting valve, whereby said work-supporting table continues to move upwardly but at a relatively much slower rate; and a third operative position in which another of said pressure ports registers with said second port of said seat to permit operating fluid under pressure to flow from said pressure chamber through said fourth conduit to the upper end of said hydraulic cylinder and in which the other of said exhaust ports interconnects said first port and said drain port of said seat to allow spent operating fluid to exhaust from the lower end of said hydraulic cylinder through said third and second conduits, whereby said work-supporting table is rapidly moved downwardly away from said drill head.

2. A drill press comprising: a drill head; a work-supporting table; and means for effecting fast and relatively slow upward movements of said work-supporting table toward said drill head and for effecting a fast return movement of said work-supporting table away from said drill head, said means including: a vertical hydraulic cylinder, a piston in said cylinder, a piston rod connecting said piston with said work-supporting table; a control valve; conduit means including a restricted by-pass conduit operatively connecting said control valve with said hydraulic cylinder, said control valve including a rotatable ported element for controlling the supply and exhaust of operating fluid to said hydraulic cylinder; and means for effecting rotation of said ported element comprising a control shaft, a control lever fixed to said control shaft, a driving cam fixed to said control shaft, a driven cam rotatably mounted upon said control shaft, means providing a lost-motion driving connection between said driving and driven cams, a bell crank lever pivotally mounted relative to said cams, a roller carried by one arm of said bell crank lever and normally engaged with the periphery of said driven cam, said bell crank lever having means associated with its other arm for effecting rotation of said ported element upon rotation of said bell crank lever about its pivot, means for effecting a return movement of said bell crank lever and for yieldably urging said roller into engagement with the periphery of one or the other of said cams, said driven cam having an arcuate portion which, when engaged by said roller, positions said ported element to admit operating fluid under pressure into the lower end of said hydraulic cylinder and to exhaust operating fluid from the upper end of said hydraulic cylinder, whereby to assure quick upward movement of said work-supporting table, said driven cam having a first stepped portion which, when engaged by said roller, positions said ported element so that operating fluid under pressure continues to flow to the lower end of said hydraulic cylinder but the exhaust of spent operating fluid from the upper end of said hydraulic cylinder through said ported element is blocked, thereby requiring said fluid to exhaust through said restricted by-pass conduit to assure continued upward movement of said work-supporting table at a relatively much slower rate, and said driven cam having a second stepped portion which, when engaged by said roller, positions said ported element so that operating fluid under pressure is admitted to the upper end of said hydraulic cylinder and is exhausted from the lower end of said hydraulic cylinder to effect a quick downward movement of said work-supporting table, said driving cam having a peripheral surface contoured to engage said roller to raise said roller clear of said stepped portions of said driven cam upon actuation of said control shaft to return said ported element to its first-described position.

3. A drill press comprising: a drill head; a work-supporting table; and means for effecting fast and relatively slow upward movements of said work-supporting table toward said drill head and for effecting a fast return movement of said work-supporting table away from said drill head, said means including a vertical hydraulic cylinder, a piston in said cylinder, a piston rod connecting said piston with said work-supporting table, a control valve conduit means including a restricted by-pass conduit operatively connecting said control valve with said hydraulic cylinder, said control valve including a rotatable ported element for controlling the supply and exhaust of operating fluid to said hydraulic cylinder, and means for effecting rotation of said ported element comprising a control shaft, a control lever fixed to said control shaft, a driving cam fixed to said control shaft, a driven cam rotatably mounted upon said control shaft, means providing a lost-motion driving connection between said driving and driven cams, a bell crank lever pivotally mounted relative to said cams, a roller carried by one arm of said bell crank lever and normally engaged with the periphery of said driven cam, said bell crank lever having means associated with its other arm for effecting rotation of said ported element upon rotation of said bell crank lever about its pivot, means for effecting a return movement of said bell crank lever and for yieldably urging said roller into engagement with the periphery of one or the other of said cams, a trip column secured to said work-supporting table for movement therewith, and a pair of trip lugs secured to said trip column in predetermined vertically spaced relation, each trip lug being arranged to engage and actuate said control lever as said trip column moves upwardly with said work-supporting table, said driven cam having an arcuate portion which, when said control lever is manually moved to a given position, is engaged by said roller and said ported element is positioned to admit operating fluid under pressure into the lower end of said hydraulic cylinder and to exhaust operating fluid from the upper end of said hydraulic cylinder to effect quick upward movement of said work-supporting table, said driven cam having a first stepped portion which is engaged by said roller upon actuation of said control lever by one of said trip lugs to rotate said driven cam through a given angle to permit said ported element to assume a position such that operating fluid under pressure continues to flow to the lower end of said hydraulic cylinder but the exhaust of spent operating fluid from the upper end of said hydraulic cylinder through said ported element is blocked, thereby requiring said fluid to exhaust through said restricted by-pass conduit to effect continued upward movement of said work-supporting table at a relatively much slower rate, and said driven cam having a second stepped portion which is engaged by said roller upon actuation of said control lever by the other of said trip lugs to rotate said driven cam through another given angle to permit said ported element to assume a position such that operating fluid under pressure is admitted to the upper end of said hydraulic cylinder and is exhausted from the lower end of said hydraulic cylinder to effect a quick downward movement of said work-supporting table, said driving cam having a peripheral surface contoured to engage said roller to raise said roller clear of said stepped portions of said driven cam upon manual actuation of said control lever to return said ported element to its first-described position.

4. A drill press, comprising: a drill head; a movable work-supporting table; a hydraulic cylinder for effecting movement of said work-supporting table toward and away from said drill head; a control valve connected with said hydraulic cylinder for controlling the admission and exhaust of operating fluid to said hydraulic cylinder; means supporting said control valve in fixed relation to said drill head; manually operable means including a hand lever for actuating said control valve to a position to control the flow of operating fluid to said hydraulic cylinder to initiate the movement of said work-supporting table toward said drill head at a rapid rate; a trip column secured to said work-supporting table and movable therewith; trip means carried by said trip column arranged to directly engage with and automatically actuate said hand lever to position said control valve to effect further movement of said work-supporting table toward said drill head; means modifying the flow of operating fluid during said further movement so that said work-supporting table moves toward said drill head at a much slower rate during the drilling operation; and other trip means on said trip column arranged to again directly engage with and actuate said hand lever to actuate said control valve to another position to control fluid flow to effect relatively rapid movement of said work-supporting table in a direction away from said drill head after said drilling operation has been completed.

5. A machine tool, comprising: a movable table; and means for effecting movement of said table including a hydraulic cylinder, a control valve for controlling the supply and exhaust of operating fluid to said hydraulic cylinder, a control lever operatively connected with said control valve, said control lever being manually actuatable for actuating said control valve to control the flow of operating fluid to said hydraulic cylinder to initiate movement of said table; a multi-sided trip column; a bracket supporting said trip column; means securing said bracket to said table for movement therewith; a set of trip lugs carried by at least two of the sides of said trip column, each of said sets of trip lugs being selectively engageable with said control lever for actuating said control lever subsequent to said manual actuation as said table is moved relative to said control lever, the trip lugs of a given set being spaced a predetermined distance apart longitudinally of said trip column to successively actuate said control lever; and means for adjusting said trip column relative to said bracket to place a selected set of trip lugs in position to actuate said control lever.

6. A machine tool, comprising: a tool-carrying element; a work-supporting element; a hydraulic cylinder for effecting movement of one of said elements toward and away from the other; a control valve including a ported rotatable disc controlling the supply and exhaust of operating fluid to said hydraulic cylinder; conduit means for supplying operating fluid under pressure to said control valve; conduits directly connecting said control valve to the opposite ends, respectively, of said hydraulic cylinder; a by-pass conduit connected in by-passing relation around said control valve arranged to exhaust spent operating fluid from one end of said hydraulic cylinder without passing through said control valve; and an adjustable flow-restricting valve connected in said by-pass conduit solely governing the rate at which by-passed fluid can be exhausted from said one end of said hydraulic cylinder, said rotatable disc of said control valve having only three operative positions; one at one limit of its travel in which fluid under pressure is rapidly supplied through said control valve to the other end of said hydraulic cylinder and spent operating fluid is exhausted through said control valve from said one end of said hydraulic cylinder to effect quick movement of one of said elements toward the other of said elements, another position at an intermediate point of its travel in which additional fluid is supplied to said other end of said hydraulic cylinder through said control valve but the exhaust of fluid through said control valve from said one end of said hydraulic cylinder is blocked so that no exhaust fluid flows through said control valve and the further movement of said one element toward said other element is restricted by the rate at which said spent operating fluid is allowed to flow through said by-pass conduit and said flow-restricting valve, and a third position at the other limit of its travel in which operating fluid under pressure is rapidly admitted through said control valve into said one end of said hydraulic cylinder and rapidly exhausted from said other end of said hydraulic cylinder through said control valve to effect a quick retraction of said one element from said other element.

7. A drill press, comprising: a base; a plurality of posts mounted upon said base; a drill head carried by said posts in spaced relation to said base; a work-supporting table slidably mounted upon said posts between said base and drill head; a hydraulic cylinder for effecting movement of said work-supporting table toward and away from said drill head; a control valve controlling the supply and exhaust of operating fluid to said hydraulic cylinder; a first conduit connected with said control valve for supplying operating fluid under pressure to said control valve; a second conduit connected with said control valve for discharging spent operating fluid from said control valve; a third conduit directly connecting said control valve with the lower end of said hydraulic cylinder; a fourth conduit directly connecting said control valve with the upper end of said hydraulic cylinder; a by-pass conduit interconnecting said second and fourth conduits, said by-pass conduit being connected around said control valve and arranged to by-pass fluid around said control valve from the upper end of said hydraulic cylinder through said fourth conduit directly to said second conduit; and an adjustable valve connected in said by-pass conduit solely controlling the rate at which fluid can be exhausted from the upper end of said hydraulic cylinder through said by-pass conduit.

8. A machine tool, comprising: a tool-carrying member; a work-supporting member; hydraulic means for moving one of said members toward the other of said members at a suitable cutting-feed rate and for retracting said one member from the other of said members at a relatively quick rate; control means for said hydraulic means including a rotatable valve element successively rotatable in the same direction, and a snap-action mechanism including means for effecting successive rotary movements of said valve element in the same direction; and means carried by said movable member arranged to successively actuate said snap-action mechanism in response to predetermined movements of said movable member for successively actuating said rotatable valve element to position said valve element to control fluid flow to said hydraulic means to automatically effect movement of said movable member toward the other of said members at a suitable cutting-feed rate for said tool and to position said valve element to control fluid flow to said hydraulic means to automatically effect relatively quick retraction of said movable member after the operation to be performed by said tool has been completed.

9. A machine tool as defined in claim 8, in which the snap-action mechanism includes elements for holding the valve element against inadvertent movement out of the positions into which it is moved by the snap-action mechanism.

10. A machine tool, comprising: a tool-carrying member; a work-supporting member; hydraulic means for incrementally moving one of said members toward the other of said members at a quick rate and at a suitable cutting-feed rate, and for retracting said one member from the other of said members at a relatively quick rate; control means for said hydraulic means including a valve element arranged to be manually moved to a position to control the flow of operating fluid to said hydraulic means to effect the initiation of the quick movement of said one member toward said other member and to be successively automatically moved in a given direction by snap-action mechanism to control fluid flow to effect said cutting feed and retraction; means for manually actuating said valve element to control the flow of operating fluid to said hydraulic means to effect said quick movement of said one member toward said other member; friction means acting to hold said valve element in the position to which it has been manually moved; snap-action mechanism including means arranged to effect movement of said valve element in the same direction to different positions; and means carried by said movable member arranged to successively actuate said snap-action mechanism in response to predetermined increments of movement of said movable member for automatically and successively actuating said valve element in the same direction to different positions to respectively control the flow of operating fluid to said hydraulic means to effect further movement of said movable member toward the other of said members at a suitable cutting-feed rate for said tool and to effect relatively quick retraction of said movable member after the operation to be performed by said tool has been completed, said snap-action mechanism including elements acting independently of said friction means to hold said valve element against inadvertent movement out of the position into which it is moved by said snap-action mechanism.

11. A semi-automatic, hydraulically operated device, comprising: a tool-supporting member; a work-supporting member; a hydraulic cylinder for effecting movement of one of said members toward and away from the other of said members; a control valve including a valve element for controlling the supply and exhaust of operating fluid to said hydraulic cylinder, said valve element being manually movable in one direction from an initial position at one limit of its travel to the opposite limit of its travel to control fluid flow to initiate advance movement of one of said members toward the other, and successively automatically movable in the opposite direction by snap-action mechanism to continue advance movement at a cutting-feed rate, and retraction of said one member from the other; a first conduit connected with said control valve for supplying operating fluid under pressure to said control valve; a second conduit connected with said control valve for draining exhaust operating fluid from said control valve; a third conduit directly connecting said control valve to one end of said hydraulic cylinder; a fourth conduit directly connecting said control valve to the other end of said hydraulic cylinder; a by-pass conduit having one end thereof connected to said fourth conduit arranged to by-pass exhaust operating fluid around said control valve from said other end of said hydraulic cylinder; an adjustable valve connected in said by-pass conduit solely controlling the rate at which fluid can be exhausted from said other end of said hydraulic cylinder through said by-pass conduit; means for manually actuating said valve element in one direction from said initial position to said opposite limit of its travel to position said valve element for controlling fluid flow to said hydraulic cylinder for initiating advance movement of said one member toward the other of said members; a snap-action mechanism for effecting successive actuation of said valve element in the opposite direction to respectively control the flow of operating fluid to said hydraulic cylinder to continue said advance at a cutting-feed rate and to effect retraction of said one member from the other and restore said valve element to its initial position; and means carried by said one member arranged to successively actuate said snap-action mechanism in response to predetermined advance movements of said one member.

DONALD G. GRISWOLD.

REFERENCES CITED

The following references are of record in the file of this patent:

UNITED STATES PATENTS

| Number | Name | Date |
| --- | --- | --- |
| 585,715 | Spears | July 6, 1897 |
| 1,046,311 | Lassiter et al. | Dec. 3, 1912 |
| 1,750,684 | Oakley | Mar. 18, 1930 |
| 1,861,497 | Hallenbeck | June 7, 1932 |
| 1,905,133 | Bishop et al. | Apr. 25, 1933 |
| 1,909,165 | Burrell | May 16, 1933 |
| 1,967,689 | Schauer et al. | July 24, 1934 |
| 1,979,710 | Schafer | Nov. 6, 1934 |
| 2,047,181 | Ferris | July 14, 1936 |
| 2,080,643 | Walther | May 18, 1937 |
| 2,293,464 | Hirnonen | Aug. 18, 1942 |
| 2,324,727 | Shartle | July 20, 1943 |
| 2,326,498 | Rodal | Aug. 10, 1943 |
| 2,339,049 | Brown et al. | Jan. 11, 1944 |